US010480298B2

(12) United States Patent
Reeves et al.

(10) Patent No.: US 10,480,298 B2
(45) Date of Patent: Nov. 19, 2019

(54) BIDIRECTIONAL PISTON SEALS WITH PRESSURE COMPENSATION

(71) Applicant: GE Oil & Gas ESP, Inc., Oklahoma City, OK (US)

(72) Inventors: Brian Paul Reeves, Oklahoma City, OK (US); Jifeng Wang, Niskayuna, NY (US); Chengbao Wang, Oklahoma City, OK (US); Omprakash Samudrala, Niskayuna, NY (US)

(73) Assignee: GE Oil & Gas ESP, Inc., Oklahoma City, OK (US)

( * ) Notice: Subject to any disclaimer, the term of this patent is extended or adjusted under 35 U.S.C. 154(b) by 327 days.

(21) Appl. No.: 15/632,310

(22) Filed: Jun. 24, 2017

(65) Prior Publication Data

US 2017/0292342 A1 Oct. 12, 2017

Related U.S. Application Data

(63) Continuation-in-part of application No. 14/075,656, filed on Nov. 8, 2013, now abandoned.

(51) Int. Cl.
*E21B 43/12* (2006.01)
*E21B 33/128* (2006.01)
(Continued)

(52) U.S. Cl.
CPC ........ *E21B 43/128* (2013.01); *E21B 33/1208* (2013.01); *E21B 33/1285* (2013.01);
(Continued)

(58) Field of Classification Search
CPC .............. E21B 43/128; E21B 33/1208; E21B 33/1285; H02K 5/132; F04B 17/03;
(Continued)

(56) References Cited

U.S. PATENT DOCUMENTS 2,218,937 A * 10/1940 Myers .................... H02K 5/132
310/87
3,475,634 A * 10/1969 Pomezkova ........... H02K 5/132
310/87
(Continued)

OTHER PUBLICATIONS

International Search Report and Written Opinion issued in connection with corresponding PCT Application No. PCT/US2018/033762 dated Sep. 7, 2018.
(Continued)

*Primary Examiner* — Charles G Freay
(74) *Attorney, Agent, or Firm* — Crowe & Dunlevy, P.C.

(57) ABSTRACT

An electric submersible pumping system for use in pumping fluids from a wellbore includes a motor, a pump driven by the motor, and a fluid expansion module connected to the motor. The fluid expansion module includes a piston seal housing and a piston assembly contained within the piston seal housing. The piston assembly includes a piston body having an exterior surface, a plurality of seals connected to the exterior surface of the piston body and a pressure equalization system. The pressure equalization system reduces a pressure differential between fluid in an annular space between the plurality of seals and fluid surrounding the first piston assembly.

20 Claims, 6 Drawing Sheets

(51) Int. Cl.
| | |
|---|---|
| *E21B 33/12* | (2006.01) |
| *F04B 11/00* | (2006.01) |
| *F04B 17/03* | (2006.01) |
| *F04B 35/04* | (2006.01) |
| *F04B 43/08* | (2006.01) |
| *F04B 43/107* | (2006.01) |
| *F04D 13/06* | (2006.01) |
| *F04D 13/10* | (2006.01) |
| *F04B 47/06* | (2006.01) |
| *F04B 53/00* | (2006.01) |
| *F04B 53/02* | (2006.01) |
| *F04B 53/08* | (2006.01) |
| *F04B 53/18* | (2006.01) |
| *H02K 5/132* | (2006.01) |

(52) U.S. Cl.
CPC .............. *F04B 11/00* (2013.01); *F04B 17/03* (2013.01); *F04B 35/04* (2013.01); *F04B 43/08* (2013.01); *F04B 43/107* (2013.01); *F04B 47/06* (2013.01); *F04B 53/008* (2013.01); *F04B 53/02* (2013.01); *F04B 53/08* (2013.01); *F04B 53/18* (2013.01); *F04D 13/0653* (2013.01); *F04D 13/10* (2013.01); *H02K 5/132* (2013.01)

(58) Field of Classification Search
CPC ........ F04B 53/02; F04B 53/04; F04B 53/008; F04B 53/08; F04B 53/18; F04B 35/04; F04B 11/00; F04B 47/06; F04B 43/107; F04B 43/08; F04D 13/0653; F04D 13/10
USPC ......................................................... 417/414
See application file for complete search history.

(56) References Cited

U.S. PATENT DOCUMENTS

| | | | |
|---|---|---|---|
| 4,174,875 A | 11/1979 | Bayha et al. | |
| 4,425,087 A * | 1/1984 | Gould | ................... F04D 29/106 310/87 |
| 4,536,137 A | 8/1985 | Bookout et al. | |
| 4,557,488 A | 12/1985 | Litherland | |
| 6,026,915 A | 2/2000 | Smith et al. | |
| 6,289,994 B1 | 9/2001 | Willauer et al. | |
| 6,302,401 B1 * | 10/2001 | Palmour | ................ F04B 53/146 277/513 |
| 6,307,290 B1 * | 10/2001 | Scarsdale | .............. E21B 43/128 310/87 |
| 7,017,672 B2 * | 3/2006 | Owen, Sr. | ................ E21B 23/06 166/123 |
| 7,066,248 B2 | 6/2006 | Howell | |
| 7,741,744 B2 * | 6/2010 | Watson | ................. E21B 43/128 166/108 |
| 9,926,756 B2 * | 3/2018 | Wesemeier | ............. E21B 25/08 |
| 2003/0132003 A1 | 7/2003 | Arauz et al. | |
| 2004/0069503 A1 * | 4/2004 | Ringgenberg | ....... E21B 33/1285 166/387 |
| 2007/0224056 A1 | 9/2007 | Watson et al. | |
| 2008/0041630 A1 | 2/2008 | Peterson | |
| 2013/0092020 A1 | 4/2013 | Nagler | |
| 2015/0021097 A1 | 1/2015 | Wesemeier et al. | |
| 2017/0030171 A1 | 2/2017 | Collins | |

OTHER PUBLICATIONS

Ferreira et al., "Design and Control of a Hydraulic Press", IEEE International Conference on Control Applications Computer Aided Control System Design, http://ieeexplore.ieee.org/document/4776750/, Oct. 4-6, 2006.

Andrews et al., "Bidirectional Downhole Barrier Valve for Lubricator Applications", Society of Petroleum Engineers, https://www.onepetro.org/conference-paper/SPE-125083-MS, 2009.

* cited by examiner

BIDIRECTIONAL PISTON SEALS WITH PRESSURE COMPENSATION

RELATED APPLICATIONS

The present application is a continuation-in-part of U.S. patent application Ser. No. 14/075,656, entitled "Electric Submersible Motor Oil Expansion Compensator" filed Nov. 8, 2013, the disclosure of which is herein incorporated by reference.

FIELD OF THE INVENTION

This invention relates generally to the field of submersible pumping systems, and more particularly, but not by way of limitation, to a system for accommodating the expansion of motor lubricants in high-temperature environments.

BACKGROUND

Submersible pumping systems are often deployed into wells to recover petroleum fluids from subterranean reservoirs. Typically, the submersible pumping system includes a number of components, including one or more fluid filled electric motors coupled to one or more high performance pumps located above the motor. When energized, the motor provides torque to the pump, which pushes wellbore fluids to the surface through production tubing. Each of the components in a submersible pumping system must be engineered to withstand the inhospitable downhole environment.

Components commonly referred to as "seal sections" protect the electric motors and are typically positioned between the motor and the pump. In this position, the seal section provides several functions, including transmitting torque between the motor and pump, restricting the flow of wellbore fluids into the motor, protecting the motor from axial thrust imparted by the pump, and accommodating the expansion and contraction of motor lubricant as the motor moves through thermal cycles during operation. Prior art seal sections typically include a "clean side" in fluid communication with the electric motor and a "contaminated side" in fluid communication with the wellbore. Bellows or bags have been used to separate the clean side of the seal section from the contaminated side.

Recently, manufacturers have employed polymer expansion bags within the seal section to accommodate the expansion and contraction of motor lubricants while isolating the lubricants from contaminants in the wellbore fluid. Although generally effective at lower temperatures, the currently available polymers become somewhat permeable at extremely elevated temperatures and allow the passage of moisture across the membrane. The moisture reduces the insulating properties of polyimide and other films used to electrically isolate components within the downhole pumping system. Although piston-based systems may provide an alternative to the use of polymer expansion bags, prior art piston-based seal assemblies are susceptible to failure from sand, scale or other particulates. Moreover, the sealing rings used in existing pistons may deform under differential pressures, apply unwanted pressure against the interior of the seal section housing and reduce the movement of the piston. There is, therefore, a need for improved designs that can be used to accommodate expansion of motor fluids in elevated temperature applications. It is to this and other needs that the presently described embodiments are directed.

SUMMARY OF THE INVENTION

In one aspect, the exemplary embodiments include an electric submersible pumping system for use in pumping fluids from a wellbore. The electric submersible pumping system includes a motor, a pump driven by the motor, and a fluid expansion module connected to the motor. The fluid expansion module includes a piston seal housing and a first piston assembly contained within the piston seal housing. The first piston assembly includes a piston body having an exterior surface, a plurality of seals connected to the exterior surface of the piston body and a pressure equalization system. The pressure equalization system reduces a pressure differential between fluid in an annular space between the plurality of seals and fluid surrounding the first piston assembly.

In another aspect, the embodiments of the present invention include a system for accommodating the expansion of motor lubricant in a motor within an electric submersible pump used for removing fluids from a wellbore. The system includes a seal section connected to a first end of the motor and a fluid expansion module connected to the second end of the motor. The fluid expansion module has a longitudinal axis and at least one piston assembly. The at least one piston assembly moves along the longitudinal axis of the fluid expansion module in response to an expansion of the motor lubricant. The at least one piston assembly includes a piston body having an exterior surface, a plurality of seals connected to the exterior surface of the piston body, and a pressure equalization system. The pressure equalization system reduces a pressure differential between fluid in the annular space between the plurality of seals and fluid surrounding the at least one piston assembly.

In yet another aspect, the embodiments of the present invention include a fluid expansion module for use in an electric submersible pumping system that includes a pump driven by a fluid-filled motor. The fluid expansion module includes a piston seal housing in fluid communication with the fluid-filled motor and a first piston assembly contained within the piston seal housing. The first piston assembly includes a piston body having an exterior surface, a plurality of seals connected to the exterior surface of the piston body and a pressure equalization system. The space between the plurality of seals creates an annular space and the pressure equalization system reduces a pressure differential between fluid in the annular space and fluid in the piston seal housing.

DETAILED DESCRIPTION

Figure 1:
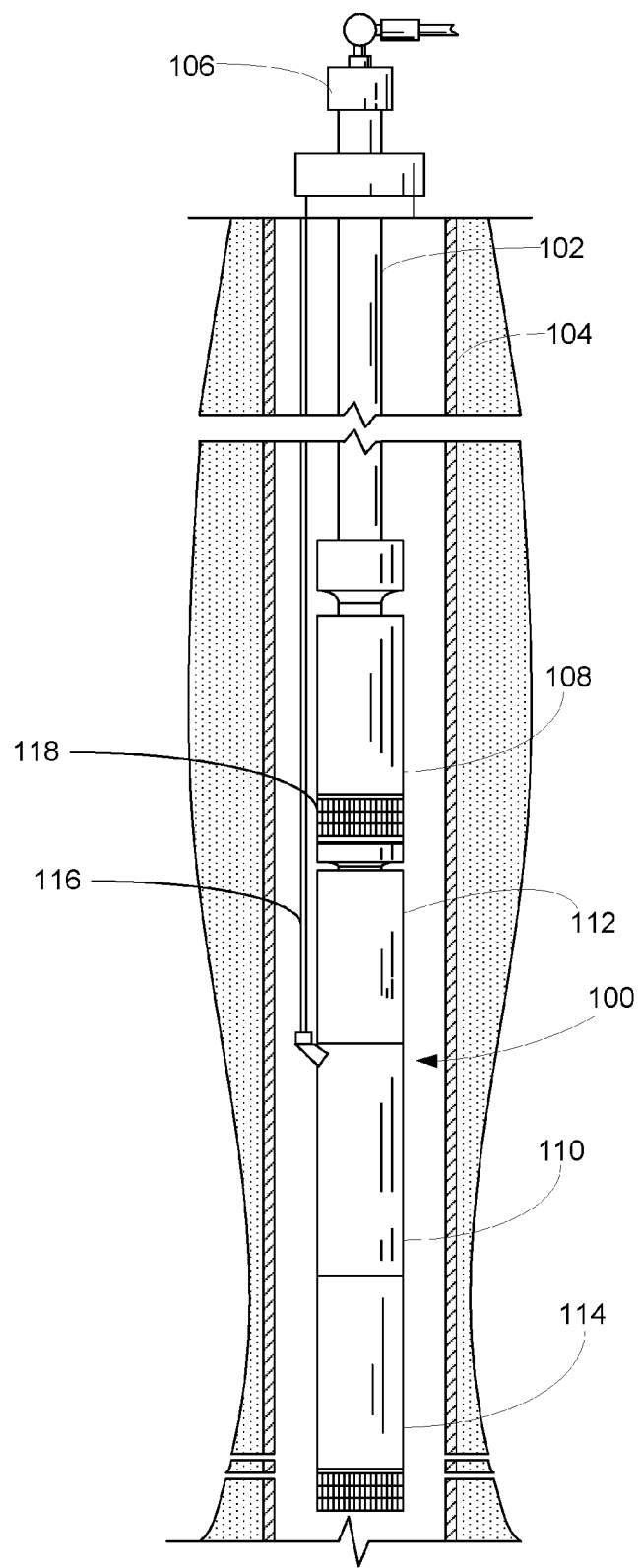
FIG. 1 depicts a submersible pumping system constructed in accordance with an embodiment of the present invention.

FIG. 1 shows an elevational view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas.

The pumping system 100 includes a pump 108, a motor 110, a seal section 112 and a fluid expansion module 114. The production tubing 102 connects the pumping system 100 to a wellhead 106 located on the surface. Although the pumping system 100 is primarily designed to pump petroleum products, it will be understood that the pumping system 100 can also be used to move other fluids. It will also be understood that, although each of the components of the pumping system are primarily disclosed in a submersible application, some or all of these components can also be used in surface pumping operations.

Generally, the motor 110 is configured to drive the pump 108. Power is provided to the motor 110 through a power cable 116. In some embodiments, the pump 108 is a turbomachine that uses one or more impellers and diffusers to convert mechanical energy into pressure head. In other embodiments, the pump 108 is configured as a positive displacement pump. The pump 108 includes a pump intake 118 that allows fluids from the wellbore 104 to be drawn into the pump 108. The pump 108 forces the wellbore fluids to the surface through the production tubing 102.

The seal section 112 is positioned above the motor 110 and below the pump 108. The fluid expansion module 114 is positioned below the motor 110. Although only one of each component is shown, it will be understood that more can be connected when appropriate, that other arrangements of the components are desirable and that these additional configurations are encompassed within the scope of exemplary embodiments. For example, in many applications, it is desirable to use tandem-motor combinations, gas separators, multiple seal sections, multiple pumps, sensor modules and other downhole components.

It will be noted that although the pumping system 100 is depicted in a vertical deployment in FIG. 1, the pumping system 100 can also be used in non-vertical applications, including in horizontal and deviated wellbores 104. Accordingly, references to "upper" and "lower" within this disclosure are merely used to describe the relative positions of components within the pumping system 100 and should not be construed as an indication that the pumping system 100 must be deployed in a vertical orientation.

Figures 2, 3:
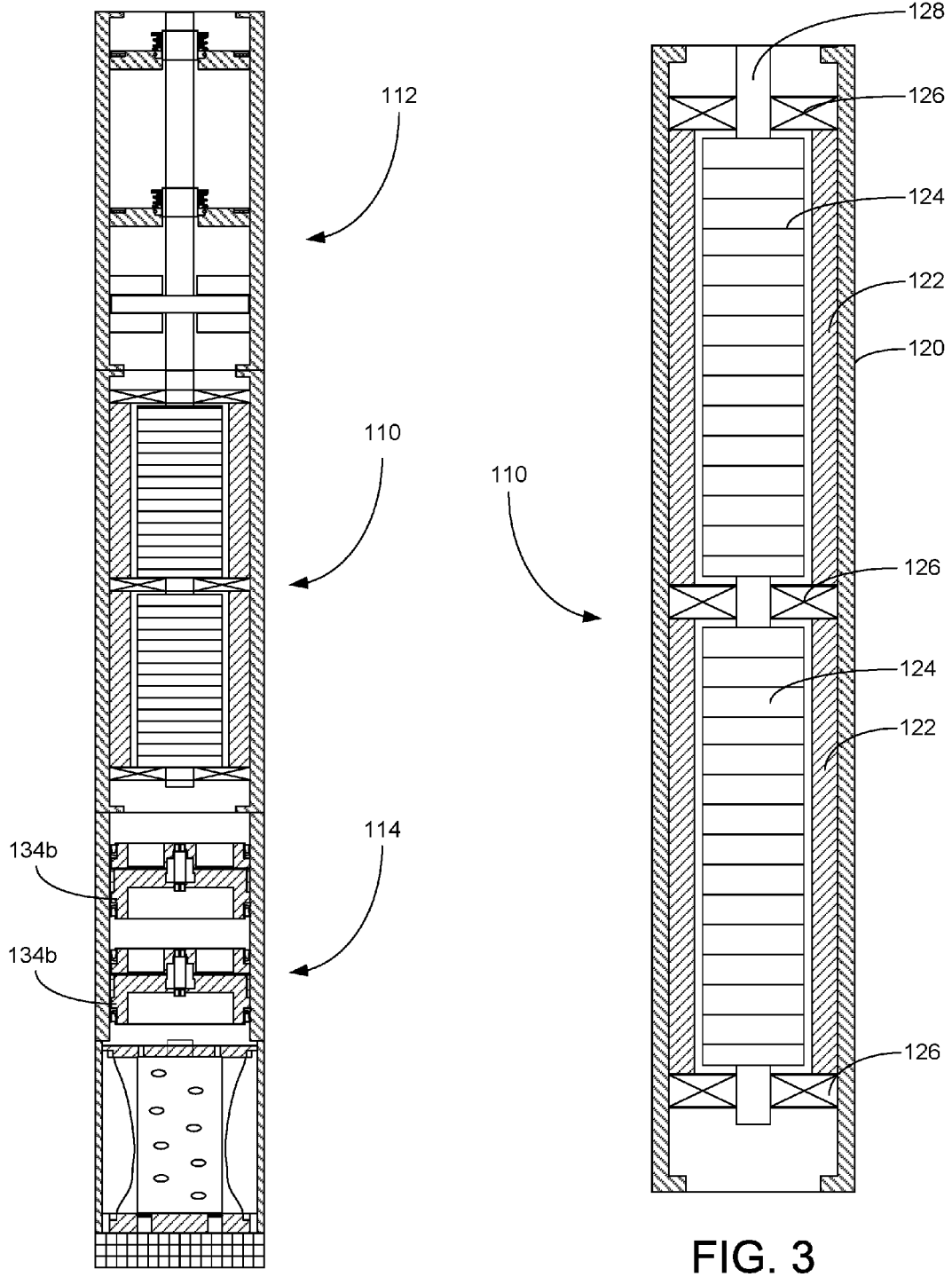
FIG. 2 provides a cross-sectional view of the motor, lower fluid expansion module and seal section of the submersible pumping system of FIG. 1.
FIG. 3 presents a cross-sectional representation of the motor of the pumping system from FIG. 2.

Referring now also to FIGS. 2 and 3, shown therein is a cross-sectional view of the seal section 112, motor 110 and fluid expansion module 114. As depicted in the close-up view of the motor 110 in FIG. 3, the motor 110 includes a motor housing 120, stator assembly 122, rotor assembly 124, rotor bearings 126 and a motor shaft 128. The stator assembly 122 includes a series of stator coils (not separately designated) that correspond to the various phases of electricity supplied to the motor 110. The rotor assembly 124 is keyed to the motor shaft 128 and configured for rotation in close proximity to the stationary stator assembly 122. The size and configuration of the stator assembly 122 and rotor assembly 124 can be adjusted to accommodate application-specific performance requirements of the motor 110. Sequentially energizing the various series of coils within the stator assembly 122 causes the rotor assembly 124 and motor shaft 128 to rotate in accordance with well-known electromotive principles. The motor bearings 126 maintain the central position of the rotor assembly 124 within the stator assembly 122 and oppose radial and axial forces generated by the motor 110 on the motor shaft 128.

The motor 110 is filled with non-conductive lubricating oil during manufacture that reduces frictional wear on the rotating components within the motor 110. As the motor 110 cycles during use and as the motor 110 is exposed to the elevated temperatures in the wellbore 104, the lubricating oil expands and contracts. It is desirable to prevent the clean motor oil from becoming contaminated with fluids and solids in the wellbore. To permit the expansion and contraction of the lubricating oil under elevated wellbore temperatures, the seal section 112 and fluid expansion module 114 are connected to the motor 110 and placed in fluid communication with the motor oil.

Figure 4:
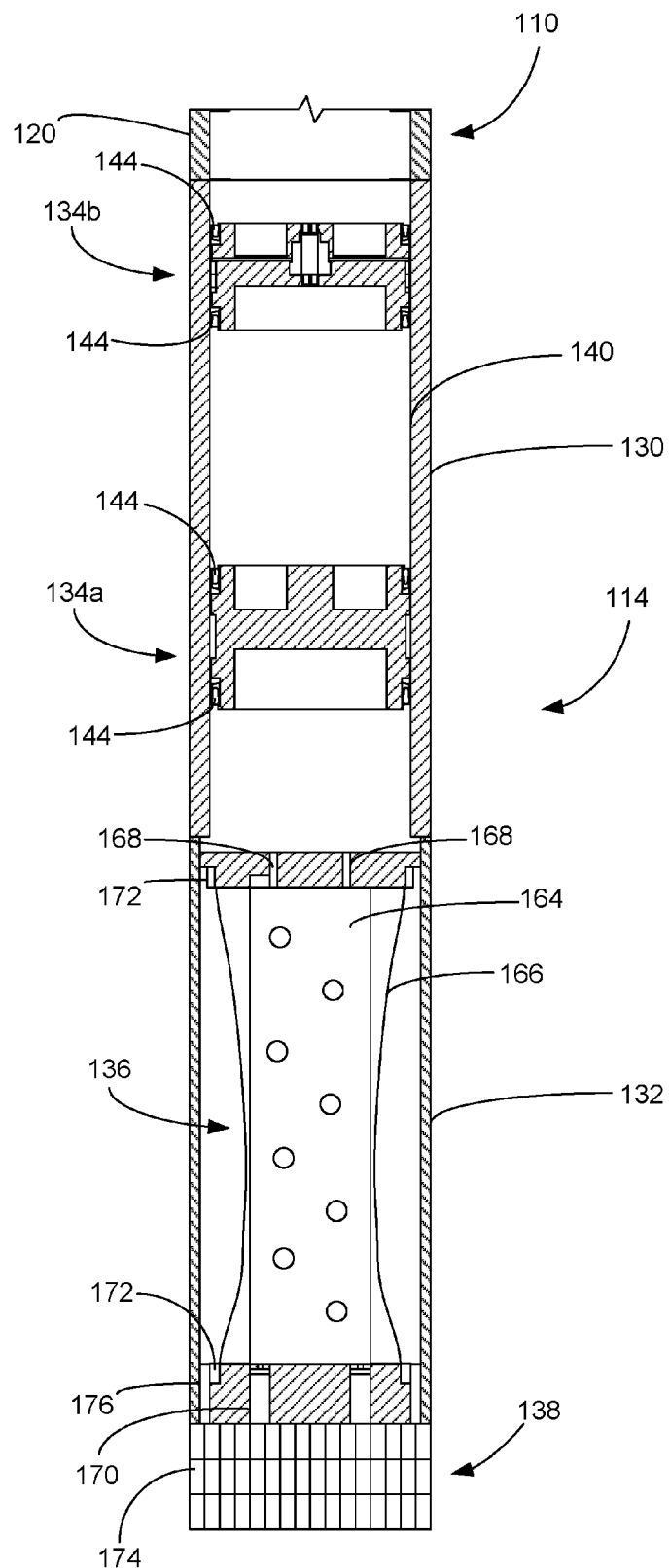
FIG. 4 presents a cross-sectional representation of the lower fluid expansion module of FIG. 2.

Continuing with FIG. 2 and referring now also to FIG. 4, shown therein is a cross-sectional view of the fluid expansion module 114. In the embodiment depicted in FIG. 4, the fluid expansion module 114 includes a piston seal housing 130, a bag seal housing 132, one or more piston assemblies 134, a bag seal assembly 136 and a fluid exchange assembly 138. It will be appreciated, however, that in some embodiments, the fluid expansion module 114 may not include all of these components.

As shown in FIG. 4, the fluid expansion module 114 includes a pair of piston assemblies 134a, 134b. The piston assemblies 134a, 134b are located in the piston seal housing 130 and are configured for axial movement within the fluid expansion module 114 in response to a difference in pressure in the fluid surrounding the piston assembly 134. Thus, if each piston assembly 134 is permitted to move freely within the piston seal housing 130, the piston assembly 134 will maintain a relatively minimal pressure differential across the piston assembly 134.

In some embodiments, the inside surface of the piston seal housing 130 includes a polymer liner 140 that reduces friction and stiction. The polymer liner 140 can be manufactured from PTFE, PFA, PEEK and other high-temperature polymers. Alternatively, the inside surface of the piston seal housing 130 can be manufactured from polished chrome, stainless steel or other durable metal. It will be noted that piston assembly 134a is constructed in accordance with a first embodiment and piston assembly 134b is constructed in accordance with a second embodiment. The similarities and differences between the first and second embodiments of the piston assemblies 134a, 134b are described below.

Figure 5:
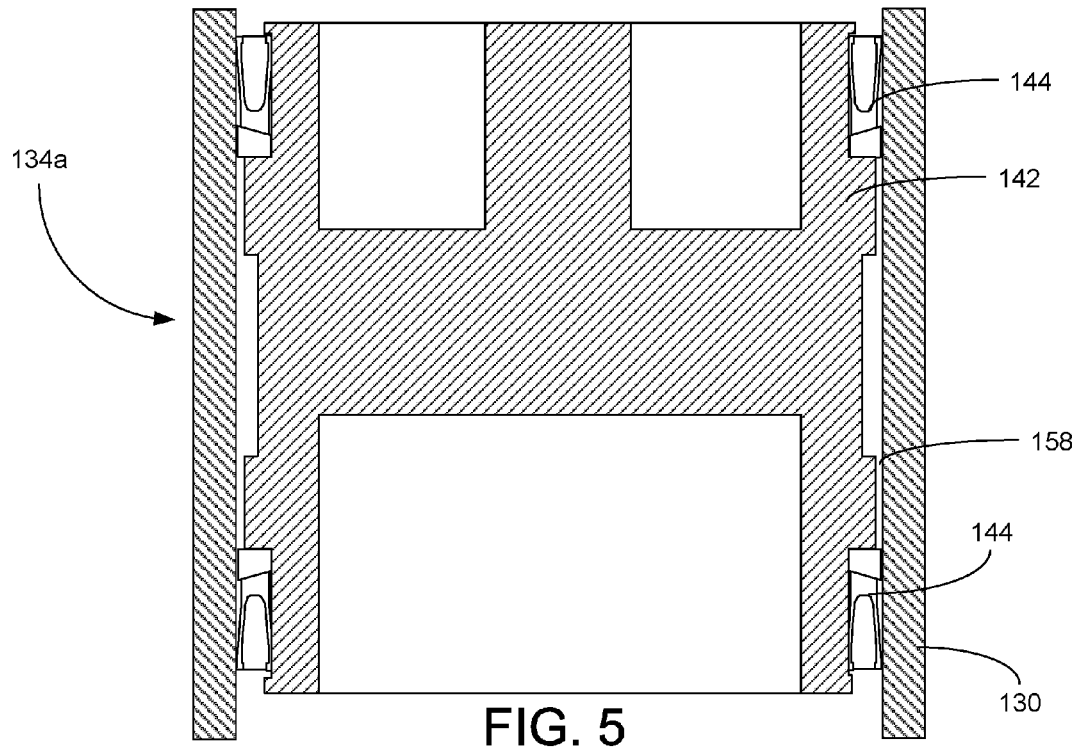
FIG. 5 presents a cross-sectional view of a piston assembly constructed in accordance with a first embodiment.

Turning to FIG. 5, shown therein is a cross-sectional view of the first embodiment of the piston assembly 134a within a portion of the piston seal housing 130. The piston assembly 134a includes a solid piston body 142 and a pair of seals 144. In some embodiments, the piston body 142 is manufactured from a highly-polished metal. Suitable metals include chrome, stainless steel and related alloys. Alternatively, the piston body 142 can be manufactured from a high-temperature rated elastomer or polymer. Polymers of the piston body 142 include polytetrafluoroethylene (PTFE), perfluoroalkoxy (PFA) and polyethether ketone (PEEK). The piston body 142 has an outside diameter that is only slightly smaller than the inside diameter of the piston seal housing 130. The seals 144 are positioned around the exterior of the piston body 142 at opposite ends of the piston body 142.

Figure 6:
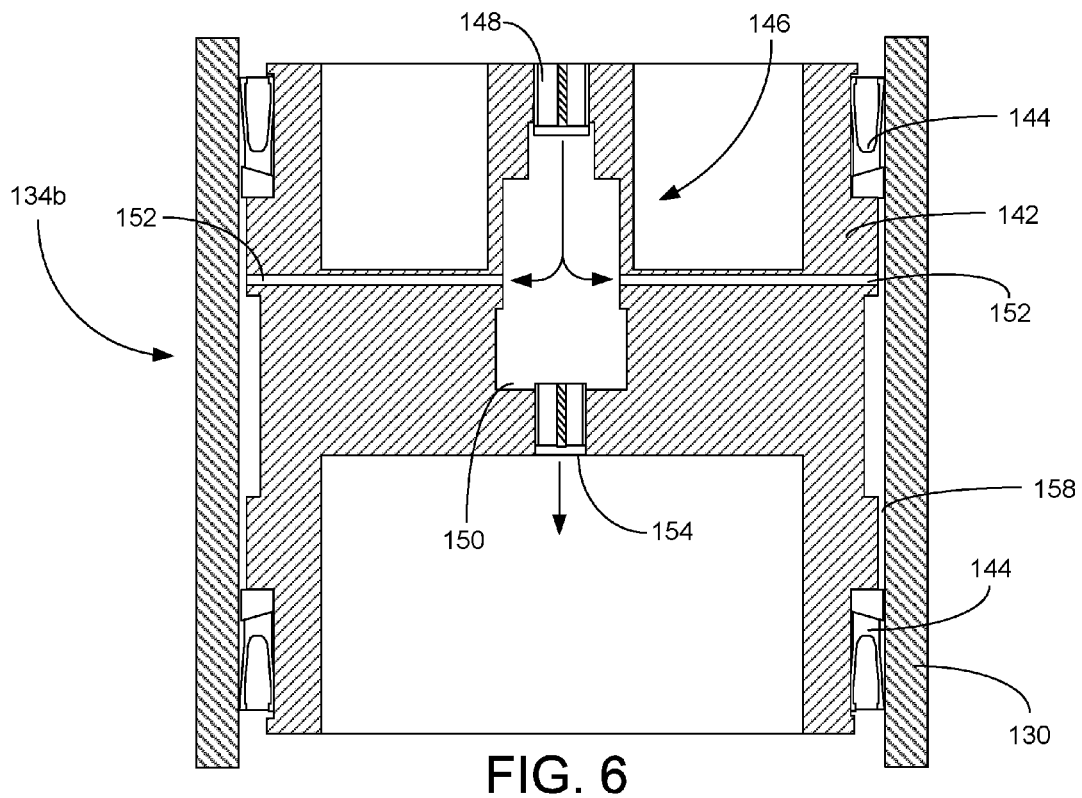
FIG. 6 presents a cross-sectional view of a piston assembly constructed in accordance with a second embodiment.

Turning to FIG. 6, shown therein is a cross-sectional view of the second embodiment of the piston assembly 134b within a portion of the piston seal housing 130. The piston assembly 134b includes a piston body 142 and pair of seals 144. The seals 144 are positioned around the exterior of the piston body 142 at opposite ends of the piston body 142. The piston assembly 134b further includes a pressure equalization system 146 that is configured to reduce the pressure differential across the seals 144 to minimize the pressure-induced deformation of the seals 144. Reducing the pressure gradient across the seals 144 allows the piston assembly 134b to move more easily within the piston housing 130 while maintaining a positive barrier between the clean motor fluid above the piston assembly 134b and the wellbore fluid below the piston assembly 134b.

The pressure equalization system 146 includes an inlet check valve 148, an equalization chamber 150, one or more pressure ports 152 and a release check valve 154. The one or more pressure ports 152 extend from the equalization chamber 150 through the piston body 142 to the annular space 158 between the piston body 142 and the interior wall of the piston seal housing 130 between the seals 144. In this way, the equalization chamber 150 is placed in fluid communication with the annular space 158.

The inlet check valve 148 is a one-way valve that opens when a pressure differential exceeds a predetermined threshold amount between the space above the piston assembly 134b and the equalization chamber 150. When the inlet check valve 148 temporarily opens, clean motor lubricant passes through the inlet check valve 148 to increase the pressure within the equalization chamber 150 and the annular space 158 to reduce the pressure gradient across the seals 144. The amount of differential pressure required to open the inlet check valve 148 can be set during manufacturing by adjusting the amount of closing force applied by a spring within the inlet check valve 148. In exemplary embodiments, the inlet check valve 148 is configured to open under a differential pressure that is greater than the amount of differential pressure that is anticipated to be present around the piston assembly 134b under normal operating conditions. In this way, the inlet check valve 148 will not open prematurely and reduce the movement of the piston seal assembly 134b under ordinary operating conditions.

The release check valve 154 is calibrated to temporarily open if the pressure within the equalization chamber 150 exceeds the pressure below the piston assembly 134b by a predetermined threshold amount. This relieves the elevated pressure within the piston assembly 134b to reduce any pressure gradient across the seals 144. Once the elevated internal pressure has been relieved, the release check valve 154 closes to prevent any fluids from passing into the equalization chamber 150.

Thus, the pressure equalization system 146 ensures the optimal performance of the seals 144 by reducing the deformation-based friction between the piston assembly 134b and the piston seal housing 130. This allows the piston assembly 134b to respond quickly to slight pressure imbalances within the piston seal housing 130. For example, if the pressure below the piston assembly 134b increases during the installation of the pumping system 100 in the wellbore 104, the piston assembly 134b may be forced upward to increase and balance the pressure above the piston assembly 134b. If the increased pressure above the piston assembly 134b is sufficiently greater than the pressure within the equalization chamber 150, the inlet check valve 148 will temporarily open to equalize the pressure around the seals 144.

Figure 7:
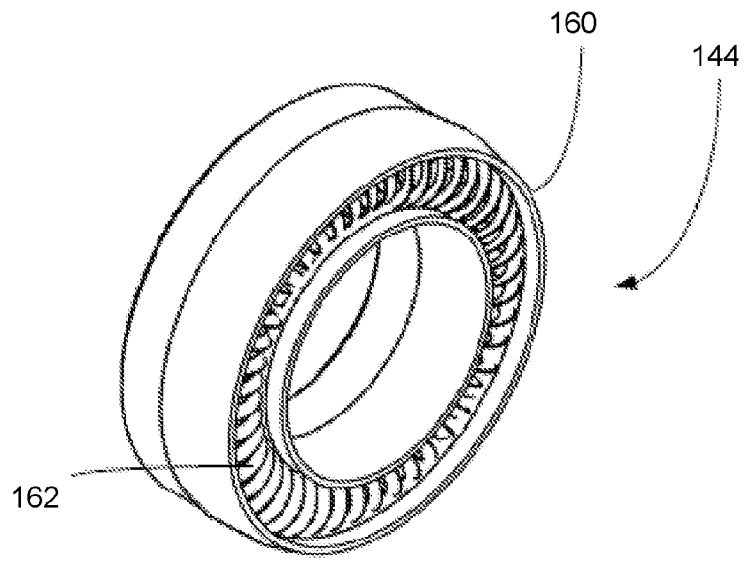
FIG. 7 presents a perspective view of the sealing ring from the piston assemblies of FIGS. 5 and 6.

FIG. 7 presents a cross-sectional view of the seal 144. The seal 144 includes a body 160 and an interior spring 162. The body 160 is manufactured from a durable, high-temperature and wear-resistant elastomer or polymer, such as polytetrafluoroethylene (PTFE), perfluoroalkoxy (PFA), polyetherether ketone (PEEK) and perfluoroelastomer. The interior spring 162 is configured to exert force against the body 160 in an outward radial direction. In this way, the spring 162 presses the body 160 against the inside surface of the piston seal housing 130. The interior spring 162 can be configured as a coiled ring, or finger springs.

Turning to back FIG. 4, the bag seal assembly 136 is contained within the bag seal housing 132. The bag seal assembly 136 includes a bag support 164, a bladder 166, inlet ports 168 and discharge valves 170. The bag support 164 is rigidly attached to the inside surface of the bag seal housing 132. The bladder 166 is secured to the bag support 164 with compression flanges 172. Alternatively, the bladder 166 can be secured to the bag support 164 with grips or hose clamps. The inlet ports 168 provide a path of fluid communication from the piston seal housing 130 into the inside of the bladder 166 and bag support 164. Importantly, the bag support 164 permits the passage of fluids between the piston seal housing 130 and bag seal housing 132 only through the inlet ports 168. Fluids external to the bladder 166 are not allowed to pass directly into the piston seal housing 130.

The discharge valves 170 are one-way relief valves that are configured to open at a predetermined threshold pressure that exceeds the exterior wellbore pressure. In this way, if the fluid pressure inside the bladder 166 exceeds the setpoint pressure, the discharge valves 170 open and relieve the pressure inside the bladder 166 by discharging a small volume of fluid into the wellbore 104. The bladder 166 can be manufactured from a high-temperature polymer or elastomer. Suitable polymers and elastomers include polytetrafluoroethylene (PTFE), perfluoroalkoxy (PFA) and polyetherether ketone (PEEK).

The bag seal housing 132 also includes the fluid exchange assembly 138. The fluid exchange assembly 138 optionally includes a solids screen 174 and a plurality of exchange ports 176. The exchange ports 176 allow fluids to pass from the wellbore 104 through the solids screen 174 into the bag seal housing 132 around the exterior of the bladder 166. The solids screen 174 reduces the presence of particulates in the bag seal housing 132. The solids screen 174 is manufactured from a metal or polymer fabric mesh.

During manufacture, the fluid expansion module 114 is filled with clean motor lubricant. The piston assemblies 134a, 134b are then placed into the piston seal housing 130. As the fluid in the motor 110 expands during operation, the increased volume exerts pressure on the upper side of the piston assembly 134b. In response, piston assembly 134b moves downward toward piston assembly 134a. When the volume between the piston assemblies 134a, 134b decreases, the increased pressure on piston assembly 134a forces it downward toward the bag seal housing 132. As piston assembly 134a moves downward it pushes clean motor lubricant through the inlet ports 168, through the bag support 152 and into the bladder 166. The bladder 166 expands to accommodate introduction of fluid from the piston seal housing 130. As the bladder 166 expands, fluid external to the bladder 166 is expelled through the exchange ports 176 and solids screen 160. If the pressure inside the bladder 166 exceeds the threshold pressure limit of the discharge valves 170, the discharge valves 170 open and vent a portion of fluid into the wellbore 104.

Conversely, during a cooling cycle, the fluid in the motor 110 contracts and the movement of the components within the fluid expansion module 114 reverses. As the pistons 134a, 134b are drawn upward, fluid is pulled out of the bladder 166. As the volume and pressure inside the bladder 166 decreases, fluid from the wellbore is pulled into the bag seal housing 132 through the solids screen 174 and exchange ports 176. The fluid expansion module 114 provides a robust mechanism for allowing expansion and contraction of lubricants from the motor 110 while maintaining an isolation barrier between the clean motor lubricants and the contaminated fluids from the wellbore 104. Notably, the use of piston assemblies 134 provide redundant barriers to the bladder 166 that are not susceptible to the increased permeability found in even high-temperature bladders. Accordingly, even if the bladder 166 is exposed to extremely high temperatures and permits the passage of some moisture from the wellbore 104 into the piston seal housing 130, the moisture is isolated from the motor 110 by the redundant piston assemblies 134.

It will be appreciated that the fluid expansion module 114 can include one or more piston assemblies 134 that may include the first embodiment of the piston assembly 134a, the second embodiment of the piston assembly 134b, or a combination of the first and second embodiments of the piston assemblies 134a, 134b (as shown in FIG. 4). Additionally, it will be appreciated that in some embodiments, the piston assemblies 134 may be used without the use of the bag seal assembly 136. In certain applications, it may be desirable to place the pump 108 below the motor 110. In those applications, the fluid expansion module 114 will be positioned above the motor 110 and the seal section 112 will be placed between the motor 110 and the pump 108. In these alternative embodiments, the bag seal housing 132 will be positioned above the piston seal housing 130.

Figure 8:
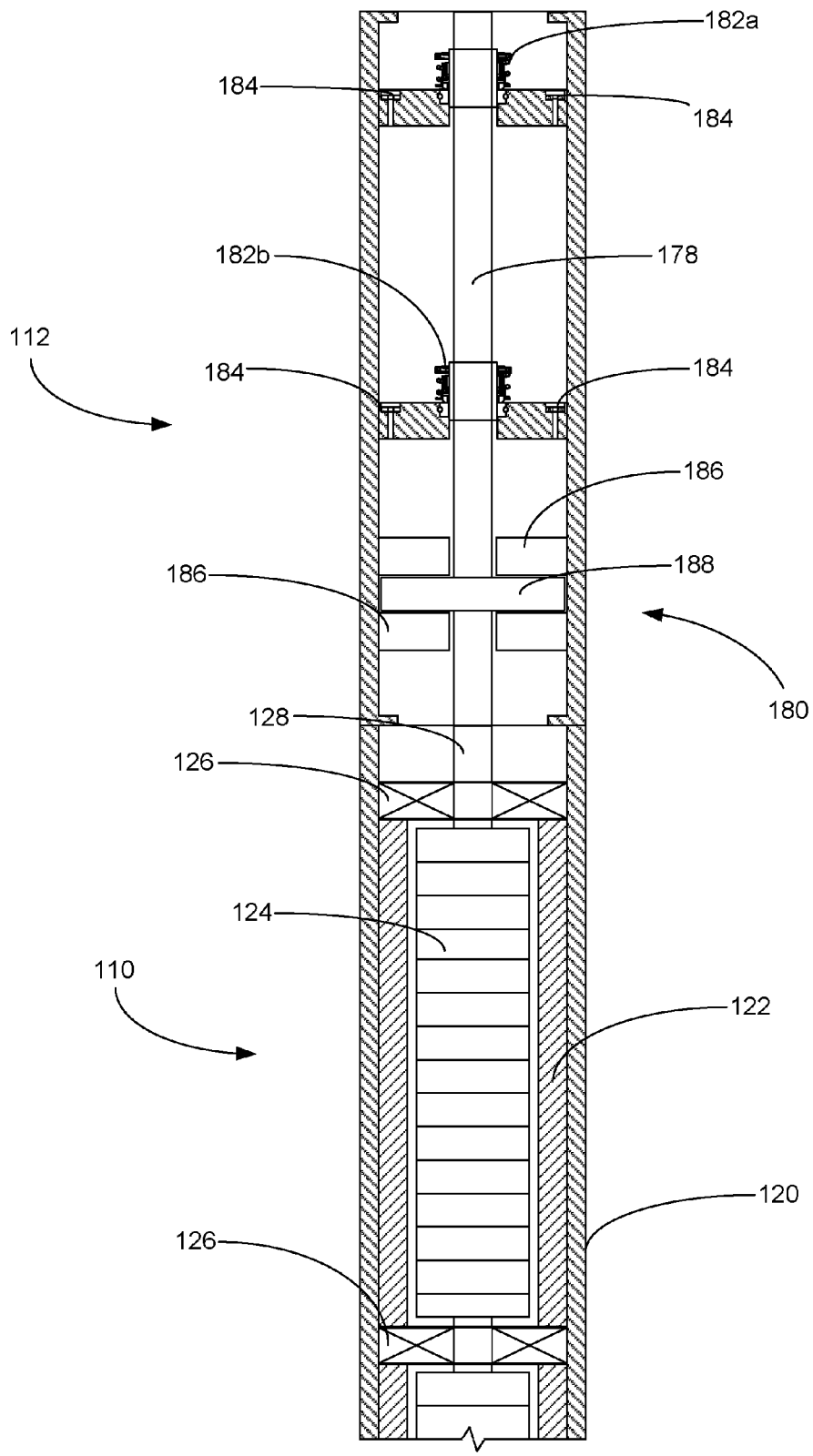
FIG. 8 provides a cross-sectional view of the seal section and motor of the pumping system from FIG. 2.

Turning to FIG. 8, shown therein is a cross-sectional view of the motor 110 and seal section 112. The seal section 112 is attached to the upper end of the motor 110 and provides a second system for accommodating the sealing of the rotating shaft 128 to the equipment and support the thrust load of the pump 108. The seal section 112 includes a seal section shaft 178, a thrust bearing assembly 180, one or more mechanical seals 182 and one or more relief valves 184. During manufacture, the seal section 112 is filled with clean motor lubricant oil.

The seal section shaft 178 is coupled to the motor shaft 128, or formed as a unitary shaft with the motor shaft 128, and transfers torque from the motor 110 to the pump 108. The thrust bearing assembly 180 includes a pair of stationary bearings 186 and a thrust runner 188 attached to the seal section shaft 178. The thrust runner 188 is captured between the stationary bearings 186, which limit the axial displacement of the runner 188 and the motor shaft 128 and seal section shaft 178.

Figure 9:
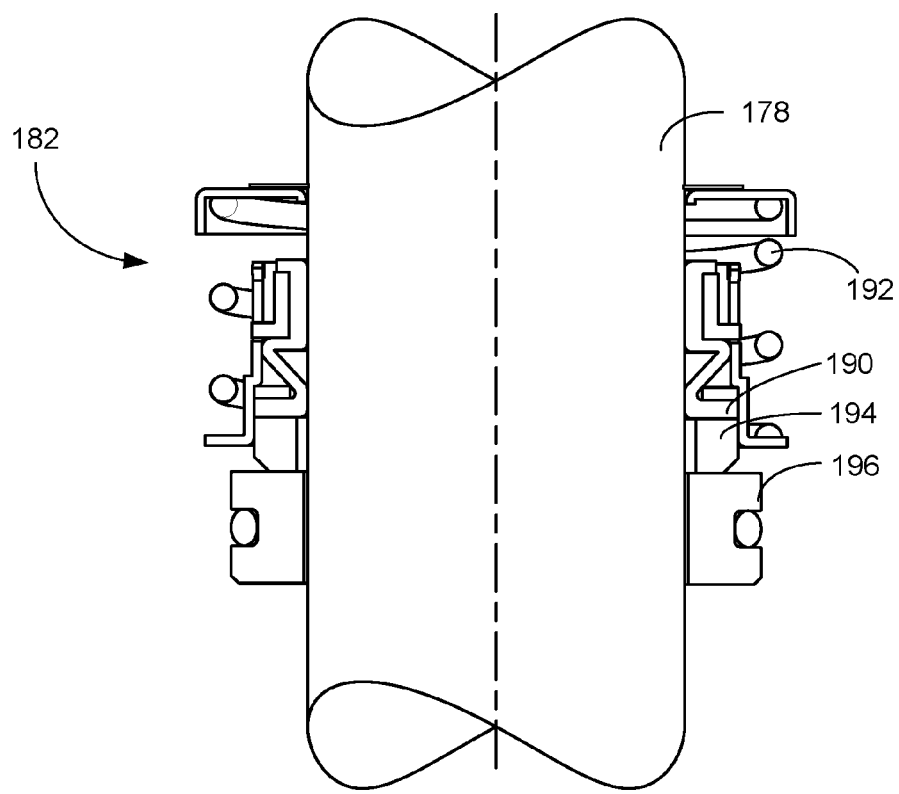
FIG. 9 provides a cross-sectional view of a mechanical seal from the seal section of FIG. 7.

As shown in FIG. 8, the seal section 112 includes a plurality of mechanical seals 182. As best illustrated in the close-up view of the mechanical seal 182 in FIG. 9, the mechanical seals 182 each include bellows 190, a coiled spring 192, a runner 194 and a stationary ring 196. These components cooperate to prevent the migration of fluid along the seal section shaft 178. The stationary ring 196 has an internal diameter sized to permit the free rotation of the seal section shaft 178. In contrast, the bellows 190, spring 192 and runner 194 rotate with the seal section shaft 178. The rotating runner 194 is held in place against the stationary ring 196 by the spring-loaded bellows 190. The bellows 190 includes a series of folds that allow its length to adjust to keep the runner 194 in contact with the stationary ring 196 if the seal section shaft 178 should experience axial displacement. The bellows 190 may be manufactured from thin corrugated metal or from elastomers and polymers, including AFLAS, perfluoroelastomer, polytetrafluoroethylene (PTFE), perfluoroalkoxy (PFA) and polyether ketone (PEEK).

The exemplary embodiments include a method of accommodating the expansion of motor lubricant with a fluid expansion module. The method includes the steps of providing a fluid expansion module that includes a piston seal housing and one or more pistons that have a pressure equalization system. The method further includes the step of connecting the fluid expansion module to a first end of the motor such that the lubricant in the motor is in fluid communication with the fluid expansion module. The method may also include the step of connecting a seal section to the second end of the motor.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. An electric submersible pumping system for use in pumping fluids from a wellbore, the electric submersible pumping system comprising:
  a motor;
  a pump driven by the motor; and
  a fluid expansion module connected to the motor, wherein the fluid expansion module comprises:
    a piston seal housing; and
    a first piston assembly contained within the piston seal housing, wherein the first piston assembly comprises:
      a piston body having an exterior surface;
      a plurality of seals connected to the exterior surface of the piston body, wherein a space between the plurality of seals creates an annular space; and
      a pressure equalization system, wherein the pressure equalization system reduces a pressure differential between fluid in the annular space and fluid surrounding the first piston assembly.

2. The electric submersible pumping system of claim 1, wherein the pressure equalization system comprises:
  an equalization chamber;
  an inlet check valve connected to the equalization chamber, wherein the inlet check valve is configured to permit the introduction of fluid into the equalization chamber; and
  one or more pressure vents connected between the equalization chamber and the annular space.

3. The electric submersible pumping system of claim 2, wherein the pressure equalization system further comprises a release check valve connected to the equalization chamber, wherein the release check valve is configured to permit the release of fluid from the equalization chamber.

4. The electric submersible pumping system of claim 1, wherein each seal further comprises:
  a body; and
  an interior spring, wherein the interior spring is configured to exert an outward radial force against the body.

5. The electric submersible pumping system of claim 1, wherein the piston seal housing includes a polymer liner.

6. The electric submersible pumping system of claim 1, wherein the fluid expansion module further comprises a second piston assembly.

7. The electric submersible pumping system of claim 6, wherein the second piston assembly comprises:
   a piston body having an exterior surface;
   a plurality of seals connected to the exterior surface of the piston body, wherein a space between the plurality of seals creates an annular space; and
   a pressure equalization system, wherein the pressure equalization system reduces a pressure differential between fluid in the annular space and fluid surrounding the second piston assembly.

8. The electric submersible pumping system of claim 1, wherein the fluid expansion module further comprises:
   a bag seal housing; and
   a bag seal assembly within the bag seal housing.

9. The electric submersible pumping system of claim 8, wherein the bag seal assembly further comprises:
   a bag support; and
   a bladder secured to the bag support.

10. The electric submersible pumping system of claim 9, wherein the bag seal assembly further comprises one or more discharge ports and wherein each of the one or more discharge ports is configured as a one-way check valve that places the interior of the bladder in fluid communication with the wellbore when opened.

11. The electric submersible pumping system of claim 1, wherein the fluid expansion module further comprises a fluid exchange assembly and wherein the fluid exchange assembly comprises:
   a solids screen;
   exchange ports; and
   wherein the fluid exchange assembly is configured to place the exterior of the bladder in fluid communication with the wellbore.

12. The electric submersible pumping system of claim 1, further comprising a seal section between the motor and the pump, wherein the seal section comprises:
   a shaft;
   one or more mechanical seals; and
   one or more relief valves.

13. A system for accommodating the expansion of motor lubricant in a motor within an electric submersible pump used for removing fluids from a wellbore, the system comprising:
   a seal section connected to a first end of the motor; and
   a fluid expansion module connected to a second end of the motor, wherein the fluid expansion module has a longitudinal axis and wherein the fluid expansion module comprises at least one piston assembly, wherein the at least one piston assembly moves along the longitudinal axis of the fluid expansion module in response to an expansion of the motor lubricant, wherein the at least one piston assembly comprises:
   a piston body having an exterior surface;
   a plurality of seals connected to the exterior surface of the piston body, wherein a space between the plurality of seals creates an annular space; and
   a pressure equalization system, wherein the pressure equalization system reduces a pressure differential between fluid in the annular space and fluid surrounding the at least one piston assembly.

14. The system of claim 13, wherein the fluid expansion module further comprises a bag seal assembly, wherein the bag seal assembly includes a bladder that expands in response to movement of the at least one piston assembly.

15. The system of claim 14, wherein the fluid expansion module further comprises a fluid exchange assembly that places the exterior of the bladder in fluid communication with the wellbore.

16. A fluid expansion module for use in an electric submersible pumping system that includes a pump driven by a fluid-filled motor, the fluid expansion module comprising:
   a piston seal housing in fluid communication with the fluid-filled motor; and
   a first piston assembly contained within the piston seal housing, wherein the first piston assembly comprises:
   a piston body having an exterior surface;
   a plurality of seals connected to the exterior surface of the piston body, wherein a space between the plurality of seals creates an annular space; and
   a pressure equalization system, wherein the pressure equalization system reduces a pressure differential between fluid in the annular space and fluid in the piston seal housing.

17. The fluid expansion module of claim 16, wherein the pressure equalization system comprises:
   an equalization chamber;
   one or more pressure vents connected between the equalization chamber and the annular space; and
   one or more check valves in fluid communication with the equalization chamber.

18. The fluid expansion module of claim 16, wherein the fluid expansion module further comprises a second piston assembly.

19. The fluid expansion module of claim 18, wherein the second piston assembly comprises:
   a piston body having an exterior surface;
   a plurality of seals connected to the exterior surface of the piston body, wherein a space between the plurality of seals creates an annular space; and
   a pressure equalization system, wherein the pressure equalization system reduces a pressure differential between fluid in the annular space and fluid surrounding the second piston assembly.

20. The fluid expansion module of claim 19, wherein the pressure equalization system of the second piston assembly comprises:
   an equalization chamber;
   an inlet check valve connected to the equalization chamber, wherein the inlet check valve is configured to permit the introduction of fluid into the equalization chamber from the piston seal housing;
   one or more pressure vents connected between the equalization chamber and the annular space; and
   a release check valve connected to the equalization chamber, wherein the release check valve is configured to permit the release of fluid from the equalization chamber to the piston seal housing.

* * * * *